INVENTORS
JAMES W. MARTIN
FREDERICK A. HESSEL
IRVING P. HAMMER
JOHN B. RUST

United States Patent Office 2,843,256
Patented July 15, 1958

2,843,256

METHANE AND CARBON DIOXIDE SOLUTIONS IN HYDROCARBONS

James W. Martin, Tuckahoe, N. Y., and Frederick A. Hessel, Upper Montclair, Irving P. Hammer, Nutley, and John B. Rust, Verona, N. J., assignors to Oil Recovery Corporation, New York, N. Y., a corporation of New York Application October 23, 1952, Serial No. 316,491

23 Claims. (Cl. 206—.6)

This invention relates to methods in increasing the solubility of hydrocarbon gases in liquid hydrocarbons by the use of carbon dioxide and to the resulting products and their utilization.

Among the objects of the present invention is the method of contacting liquid hydrocarbons with a gas predominantly lower hydrocarbon in the presence of carbon dioxide.

Other objects of the invention will appear from the more detailed description set forth below, it being understood that such more detailed description is given by way of illustration and explanation only, and not by way of limitation, since various changes therein may be made by those skilled in the art, without departing from the scope and spirit of the present invention.

Figure 1:
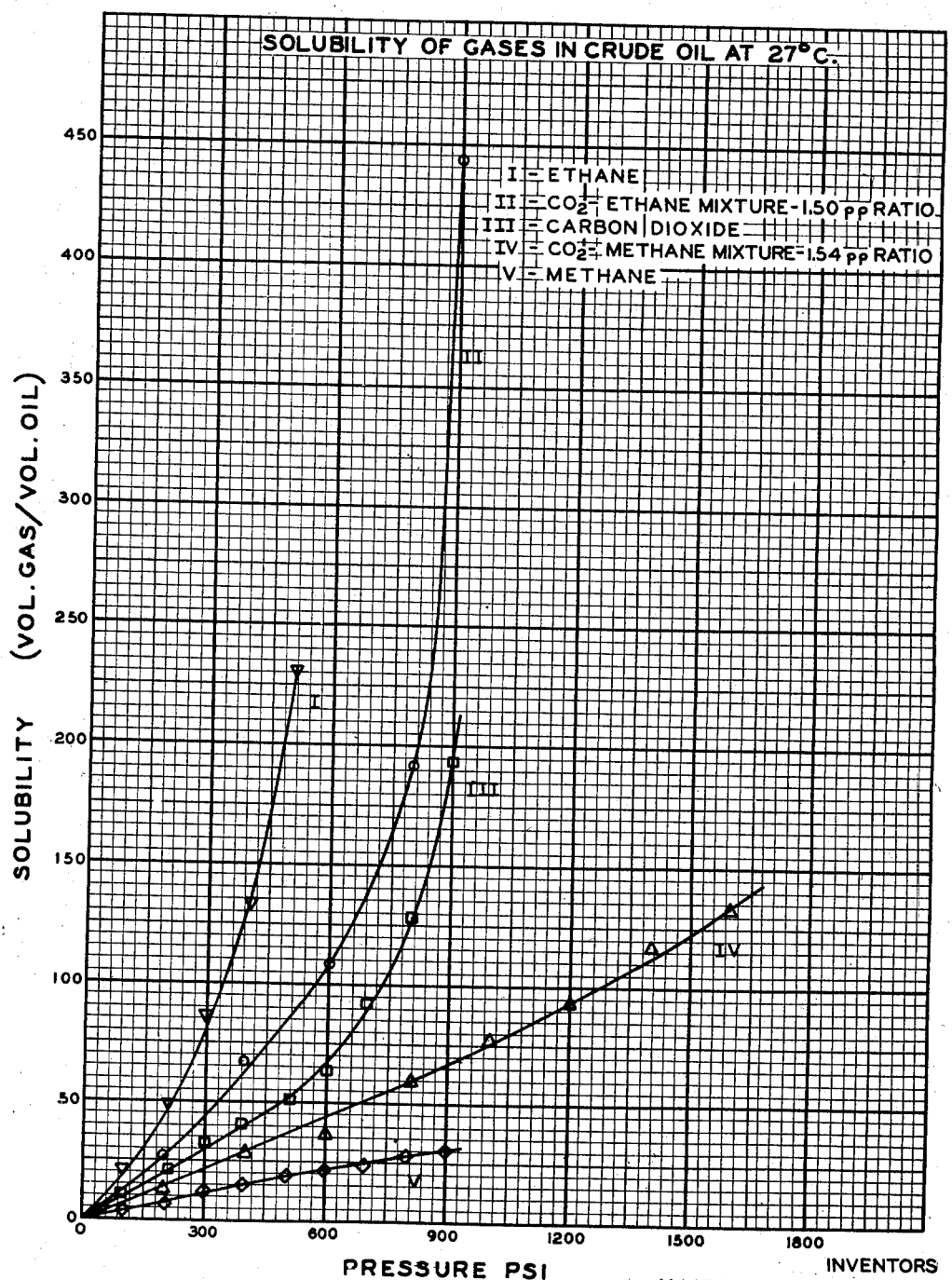
Figure 2:
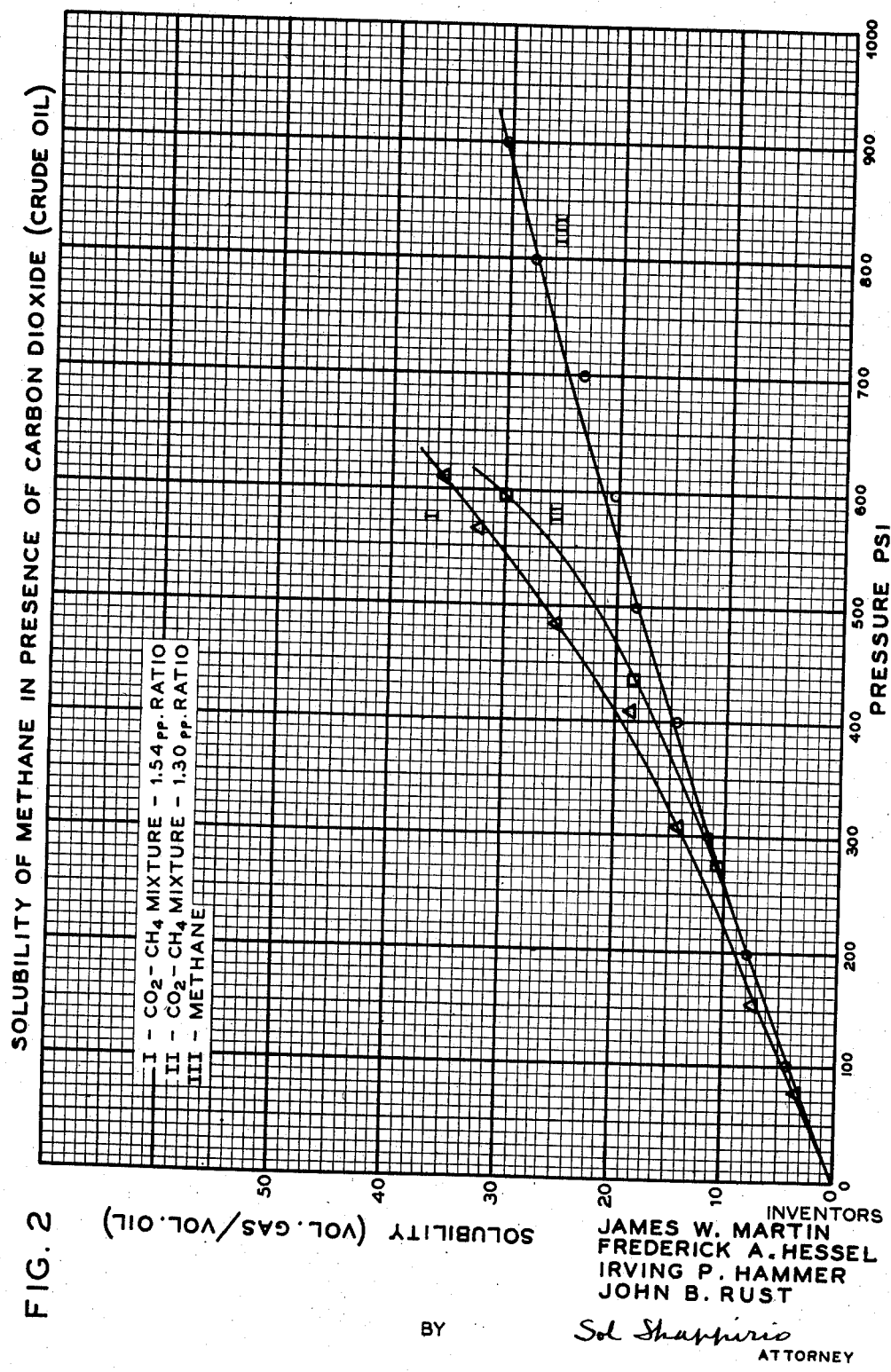
Figure 3:
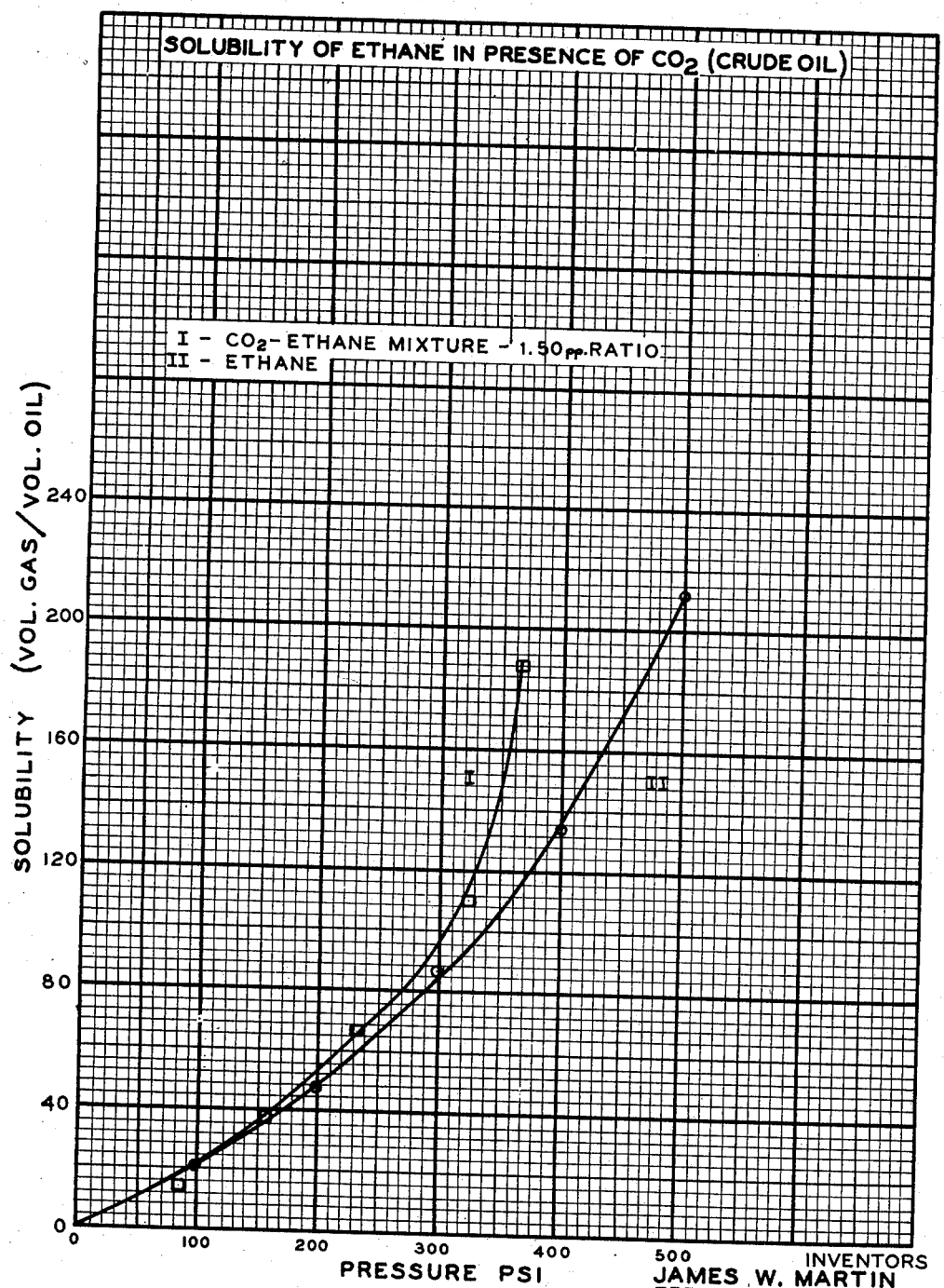
Figure 4:
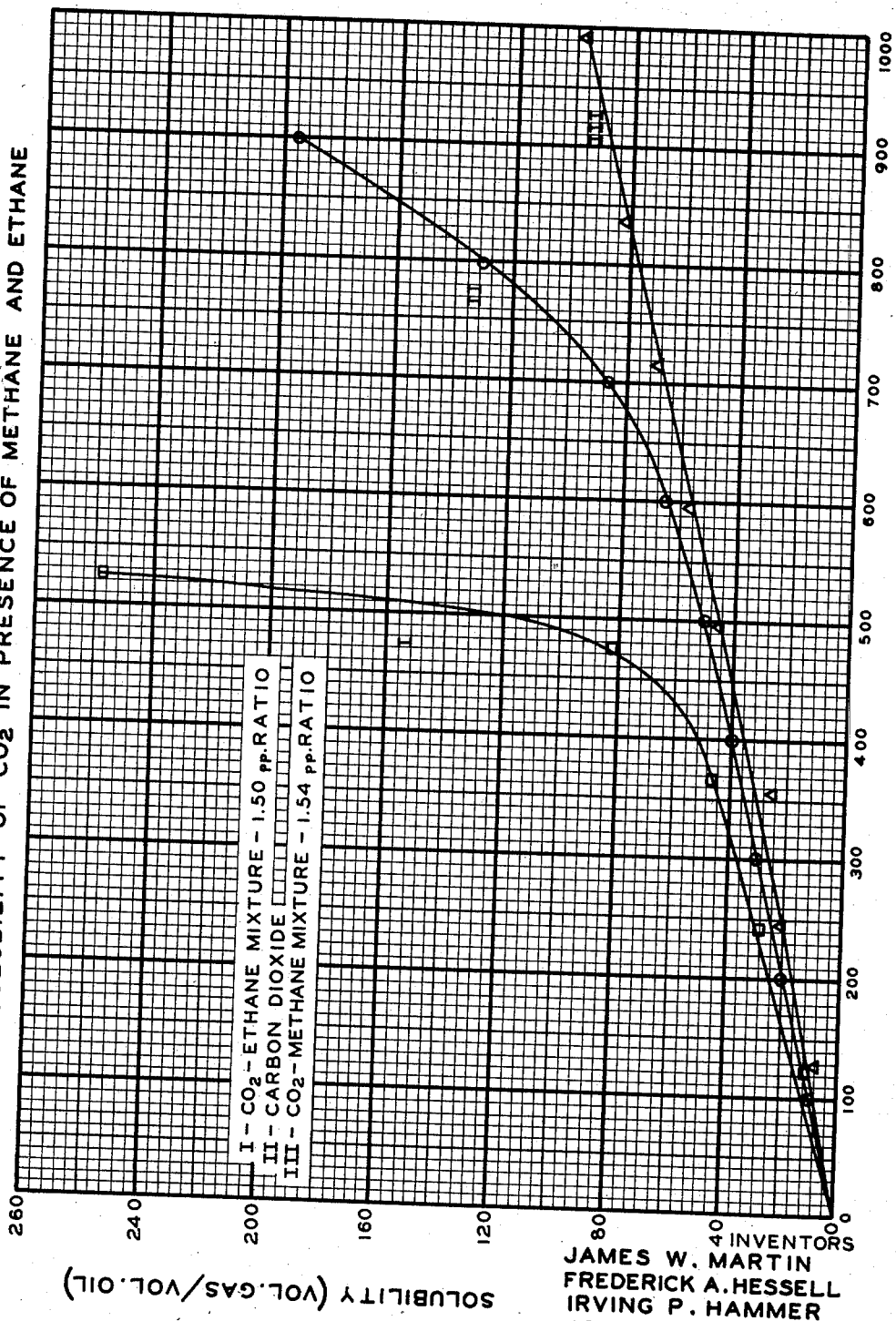
Figure 5:
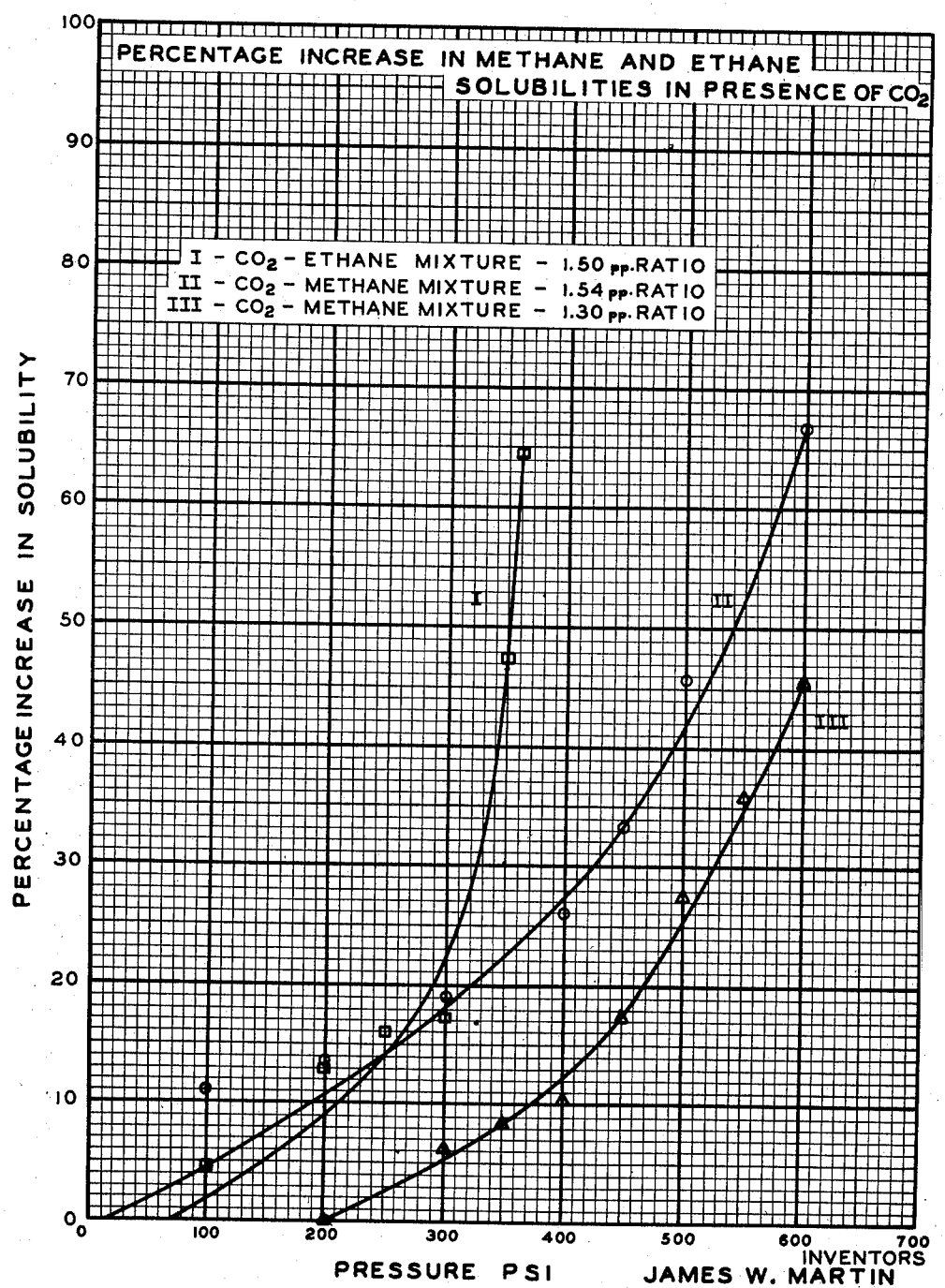

In accordance with that more detailed description there is shown in the accompanying drawings, in Figure 1, curves showing solubility of certain gases in crude oil; in Figure 2, curves showing crude oil solubility of methane in presence of carbon dioxide; in Figure 3, curves showing crude oil solubility of ethane in presence of carbon dioxide; in Figure 4, curves showing crude oil solubility of carbon dioxide in presence of methane and ethane; and in Figure 5, curves showing percentage increase in crude oil solubilities of certain gases in the presence of carbon dioxide.

In accordance with the present invention, it has unexpectedly been found that the solubility of hydrocarbons which are gases under standard conditions of temperature and pressure (0° C. at 760 mm.) in liquid petroleum hydrocarbon fractions, is increased substantially in the presence of carbon dioxide.

The hydrocarbon gases generally include these hydrocarbons both saturated and unsaturated having up to and including four carbon atoms, among which may be mentioned particularly methane, ethane, propanes, butanes, ethylene, propylene, and acetylene; and also mixtures of these gases such as natural gas which is predominantly methane but includes ethane and in some instances, higher components as well as other mixtures such as those produced synthetically. The term "gas predominantly methane" or any analogous term when used herein covers such individually named gases as well as mixtures in which a named gas is the predominant, usually major component. The liquid petroleum hydrocarbon fractions include both crude and refined petroleum oils and fractions thereof. They may be paraffinic base type oils, naphthenic base type oils, etc., and the fractions thereof. The invention will be sufficiently illustrated below by use of a Pennsylvania grade crude oil.

While it has been found that the normally gaseous hydrocarbons referred to above both, alone and in admixture, are substantially more soluble in liquid petroleum hydrocarbon fractions such as crude oil, the effect of the hydrocarbon gas on the solubility of the carbon dioxide in the liquid petroleum hydrocarbon fractions is not always the same. Thus, gases predominantly methane such as methane per se and natural gas, decrease the solubility of carbon dioxide in for example crude oil, while the hydrocarbon gases above methane generally increase the solubility of carbon dioxide in the crude oil for example. Thus methane and gases predominantly methane, therefore differentiate themselves in certain characteristics from gases of at least two carbon atoms, and are not equivalents in all respects.

Generally as to all of the gaseous hydrocarbons referred to herein, it may be said that in the presence of carbon dioxide under superatmospheric pressure, increased solubility of the hydrocarbon gas in the liquid hydrocarbon fraction is exhibited. However, the solubility is influenced materially by a number of factors, including the partial pressure of the gaseous hydrocarbon in contact with the liquid hydrocarbons and the ratio of the partial pressure of the carbon dioxide to that of the gaseous hydrocarbon present. Those factors are very important in the present invention, and critical values will be evidenced where the order of increased solubility is substantial. For a given order of increased solubility, as the ratio of partial pressures of carbon dioxide to hydrocarbon gas increases, the lower is the partial pressure of the hydrocarbon gas which is needed to give a particular order of increased solubility. The solubility in general, is not a straight line relation however, and critical points or areas are evidenced in which the increase in solubility is very substantially evidenced as will appear from data given below. Here again methane deviates in its action as compared with the other hydrocarbon gases, since at lower partial pressure ratios of carbon dioxide to methane or gases predominantly methane, the partial pressure of methane to give substantially increased solubility may have to be very materially greater than for example is the case with ethane.

As a general rule, the carbon dioxide will be at least 50% by volume of the total gas in contact with the liquid hydrocarbons, so that the ratios of partial pressure of carbon dioxide to hydrocarbon gas will be at least 1:1. It may be as low as 0.1:1 but in such cases, the partial pressure of the hydrocarbon gas present will have to be very much greater as for example with methane of the order of 1400 to 1600 p. s. i. in order to get substantial increase in solubility over that obtained in the absence of carbon dioxide. The partial pressure ratio will generally not exceed about 2:1 and usually not above 1.5:1. Thus with methane, the pressures may generally be a partial pressure of methane of from about 50 to 1600 p. s. i. and a ratio of partial pressures of carbon dioxide to methane of from about 2:1 or 1.5:1 to 0.1:1. With ethane, pressures may be from about 50 to 500 p. s. i. partial pressure of ethane and ratios of partial pressures of carbon dioxide to ethane of from about 1.5:1 to 0.1:1; preferred pressures being from about 150 to 400 p. s. i and partial pressure ratios of from about 1.5:1 to 1:1. For mixtures of the gaseous hydrocarbons, the pressure values will usually lie between those for the individual gases and depend on the predominant component; but here again there are critical values where the relation departs materially from a straight line function.

In producing the solutions any manner of contacting the materials may be used. The oils or other liquid hydrocarbons may be contacted with the gases until the desired solution is obtained. Mixtures of carbon dioxide with the desired lower paraffinic hydrocarbons may be used to contact the oil to produce the solution; or, the gases may be successively contacted with the oil to produce the solutions. In the examples given below, when the combination of $CO_2$/methane was used, the oil was first saturated with carbon dioxide, followed by contact with methane. This procedure was desirably reversed when ethane was used since the maximum pressure of gaseous ethane at 70° F. amounts to only 528 p. s. i. The ethane-carbon dioxide examples referred to below were produced in this way. The actual procedure may vary depending on the particular gases, the type of crude oil, temperature, total pressures, partial pressures of the components of the gaseous mixtures, etc.

The resulting solutions may vary in character depending on the components and the conditions under which they are produced and maintained. These solutions may be used as a source of the oils or of the gaseous components thereof and may be shipped in pressure containers to points of utility.

Although an appreciable amount of data is available in the literature dealing with the solubility of natural gas, methane, and other gases in various crude oils or other hydrocarbon systems, at elevated pressures, very little information is available concerning the similar solubility of carbon dioxide, ethane, or mixtures of carbon dioxide and gaseous hydrocarbons.

For utilization comparatively herein, the solubility of carbon dioxide, methane and ethane in Pennsylvania grade crude oil at 27° C. was determined.

In these determinations, substantially the same procedure was followed in all instances. A given volume of crude oil was contacted intimately with the gas or gases for the desired determination, until saturation was reached, which usually required several hours. When the pressure remained constant, this was taken as indicating that maximum solubility of the gas in the oil had been reached. The gas dissolved in the oil was determined. Standard methods were used throughout.

The data for the stated gases is given below in Table I and plotted in Figure 1 of the drawings.

TABLE I

Solubility of gases in Pennsylvania grade crude oil—
A. P. I. gravity 42°

[Temperature 27° C.]

| Pressure, p. s. i. | Solubility of Gas (vols. gas/vol. oil) | | |
|---|---|---|---|
| | Carbon Dioxide | Methane | Ethane |
| 100 | 10.0 | 4.4 | 21.0 |
| 200 | 20.4 | 8.0 | 47.4 |
| 300 | 28.8 | 11.5 | 86.2 |
| 400 | 40.6 | 14.6 | 134.8 |
| 500 | 51.4 | 18.1 | 232 |
| 600 | 64.7 | 20.6 | |
| 700 | 87.3 | 23.4 | |
| 800 | 129.0 | 27.9 | |
| 900 | 194.2 | 30.5 | |

The following points may be noted in this connection. The solubility of methane is practically a straight line function over the pressure range examined. The carbon dioxide data are interesting in that while the solubliity increases gradually over the range of 100 to 500 p. s. i. in a straight line fashion, a rather sharp increase in the slope of the solubility curve occurs at the 600-700 p. s. i. pressure point. Above this inflection point the solubility of carbon dioxide increases rapidly with increasing pressure. The solubility of ethane increases rapidly with increasing pressure with the result that at a pressure of 500 p. s. i. the solubility is as much as 232 volumes of ethane per volume of crude oil.

Work was carried out on mixtures of carbon dioxide and methane. The crude oil was contacted with gaseous mixtures given in the specific examples of Table II under the conditions set forth there. The data is given below in Table II and plotted in Figures 2 and 4 of the drawings.

TABLE II

Solubility of gases in petroleum grade crude oil—
A. P. I. gravity 42°

[Temperature 27° C.]

| Total Pressure, p. s. i. | $CO_2$, p. p., p. s. i. | $CH_4$, p. p. | Ratio, $CO_{2pp}/CH_{4pp}$ | Total gas solubility (Vol. gas/vol. oil) | $CO_2$ solubility (Vol. gas/vol. oil) | $CH_4$ solubility |
|---|---|---|---|---|---|---|
| 200 | 122 | 78 | 1.56 | 13.5 | 9.8 | 3.7 |
| 400 | 244 | 156 | 1.56 | 28.1 | 20.7 | 7.4 |
| 600 | 355 | 245 | 1.45 | 37.4 | 27.3 | 10.1 |
| 800 | 492 | 308 | 1.60 | 60.8 | 46.2 | 14.6 |
| 1,000 | 592 | 408 | 1.45 | 77.9 | 59.2 | 18.7 |
| 1,200 | 712 | 488 | 1.46 | 93.5 | 58.3 | 25.2 |
| 1,400 | 837 | 563 | 1.49 | 116.1 | 83.6 | 32.5 |
| 1,600 | 990 | 610 | 1.62 | 133.0 | 97.4 | 35.6 |

It was noted that solubility of methane in crude oil in the presence of carbon dioxide is related to the equilibrium ratio of the partial pressures of the two gases. In general, the greater the $CO_2$:$CH_4$ partial pressure ratio, the greater the increase in the methane solubility at a given pressure. Thus, in the data given in Table II the $CO_2$:$CH_4$ partial pressure ratios at the equilibrium final pressure was maintained between the limits of $1.54 \pm 0.08$. However, for comparison purposes there is also included in Figure 2 the curve obtained when the $CO_2$:$CH_4$ partial pressure ratios were kept within the limits of $1.30 \pm 0.08$. It can be seen that the presence of larger amounts of $CO_2$ in the equilibrium gas mixture consistently increases the solubility of the methane at a given pressure. It is to be noted that at the $CO_2$:$CH_4$ ratios of either 1.54 or 1.30 the methane solubility curve shows a pronounced change of slope at a partial pressure of about 400 p. s. i. and 450 p. s. i. respectively in contrast to the solubility curve for methane along which no distinct increase in slope occurs over the pressure range studied. This change of slope is probably related to the fact that at 400 p. s. i. $CH_4$ partial pressure and a $CO_2$:$CH_4$ ratio of 1.54, the partial pressure of the carbon dioxide present is slightly above 600 p. s. i. which is the pressure area wherein the normal carbon dioxide solubility curve also begins to show a sharp increase in slope.

With regard to the effect of the presence of methane on the solubility of carbon dioxide, it can be seen by examining Fig. 4, that the resulting solubility curve is practically linear in nature. There is no longer a sudden change in slope at the 600 p. s. i. pressure point and the net result appears to be a marked reduction in the carbon dioxide solubility particularly in the pressure range of 600-1000 p. s. i.

The production of solutions of ethane and carbon dioxide was carried out by contacting the crude oil with gaseous mixtures in examples tabulated in Table III below, and plotted in Figures 3 and 4 of the drawings.

TABLE III

Solubility of ethane in Pennsylvania grade crude oil in presence of carbon dioxide

[Temperature 27° C.]

| Total pressure, p. s. i. | $CO_2$, p. p., p. s. i. | $C_2H_6$, p. p. | Ratio, $CO_{2pp}/C_2H_{6pp}$ | Total gas solubility (Vol. gas/vol. oil) | $CO_2$ solubility (Vol. gas/vol. oil) | $C_2H_6$ solubility |
|---|---|---|---|---|---|---|
| 200 | 119 | 81 | 1.47 | 27.0 | 11.7 | 15.3 |
| 400 | 242 | 158 | 1.53 | 66.5 | 28.9 | 37.6 |
| 600 | 364 | 236 | 1.54 | 109.1 | 44.2 | 64.0 |
| 800 | 475 | 325 | 1.46 | 193.2 | 83.1 | 110.1 |
| 900 | 537 | 363 | 1.48 | 443.5 | 256.0 | 187.5 |

These data are particularly interesting in that not only does the presence of carbon dioxide increase the solubility of ethane in oil at a given pressure but, at the same time, the presence of ethane increases the solubility of the carbon dioxide. These examples were carried out at a $CO_2:C_2H_6$ partial pressure ratio of $1.50\pm0.04$. At this ratio, an examination of Figs. 3 and 4 shows that a very rapid increase in solubility occurs in both the carbon dioxide and ethane curves at partial pressures of about 450 and 325 p. s. i. respectively.

On the basis of the data obtained it is apparent that the presence of carbon dioxide has a marked effect in increasing the solubility of gaseous hydrocarbons in crude oil. In view of the data obtained with both methane and ethane it appears that the greater the molecular weight of the hydrocarbon involved, the more marked is the increase in solubility brought about by the presence of carbon dioxide.

Since natural gas usually consists mainly of methane with varying quantities of ethane and higher hydrocarbons, it can be expected that the increase in solubility of natural gas in the presence of $CO_2$ will be somewhere between that of methane and of ethane. Solutions of natural gas and carbon dioxide in crude oil were produced. A synthetic natural gas consisting of 80% methane and 20% ethane was used with Pennsylvania grade crude oil to illustrate this phase of the invention.

At a $CO_2$:synthetic natural gas ratio of 1.30 and a natural gas partial pressure of 540 p. s. i. the increase in natural gas solubility as compared to the increase in solubility of $CH_4$ under the same conditions were as follows:

| Gas Mixture | Solubility in Pennsylvania Grade Crude Oil (Vols. of hydrocarbon gas/vol. of oil) | Percent Increase in Solubility over that of pure $CH_4$ |
|---|---|---|
| $CH_4$ | 19.5 | |
| $CO_2:CH_4$ | 26.0 | 33.3 |
| $CO_2$:Natural Gas (80% $CH_4$, 20% $C_2H_6$) | 35 | 80.0 |

It is significant that while the partial pressure of the ethane in the natural gas mixture at 540 p. s. i. is only slightly more than 100 p. s. i., the percentage increase in solubility of the total gaseous hydrocarbon mixture was more than double that of methane from a carbon dioxide-methane mixture (1.30 $CO_2:CH_4$ ratio).

With respect to the actual percentage increase in solubility of methane in the presence of $CO_2$ over that of pure methane, reference to Fig. 5 of the drawing shows that to attain the same 30% increase in solubility, the partial pressure of the $CH_4$ in a $CO_2$–$CH_4$ mixture of a 1.5 $CO_2:CH_4$ p. p. ratio need only be 420 p. s. i. as compared to 530 p. s. i. $CH_4$ when the gas mixture has a 1.3 $CO_2:CH_4$ p. p. ratio. Furthermore, when the ratio is 1.3 $CO_2:CH_4$ no particular increase in methane solubility occurs until the methane partial pressure is above 200 p. s. i. Should the $CO_2:CH_4$ ratio be reduced further, both the total pressure of the gas mixture and the methane partial pressure would have to be higher before the increase in methane solubility would become apparent.

Having thus set forth our invention, we claim:

1. The method of increasing the solubility of a gas predominantly methane in a liquid petroleum hydrocarbon fraction which comprises contacting the liquid fraction with carbon dioxide in the presence of the hydrocarbon gas predominantly methane, the partial pressure of the gas predominantly methane being from about 50 to about 1600 p. s. i., the ratio of partial pressures of carbon dioxide to gas predominantly methane being from about 2:1 to 0.1:1, to produce a solution of carbon dioxide and a hydrocarbon gas predominantly methane in a liquid petroleum hydrocarbon fraction.

2. The method of claim 1 in which the gas is methane, the partial pressure of the methane is from about 150 to 1400 p. s. i. and the partial pressure ratio of carbon dioxide to methane is from about 1.5:1 to about 1:1.

3. The method of claim 2 in which the liquid petroleum hydrocarbon fraction is crude oil.

4. The method of claim 2 in which the liquid petroleum hydrocarbon fraction is a refined oil fraction.

5. The method of claim 2 in which the partial pressure of the methane is at least about 200 p. s. i. and the partial pressure ratio is about 1.5:1.

6. The method of claim 2 in which the partial pressure of the methane is at least about 300 p. s. i. and the partial pressure ratio is about 1.3:1.

7. The method of claim 1 in which the gas predominantly methane is natural gas, and the partial pressure ratio of carbon dioxide to natural gas is about 1.5:1 to 1:1.

8. The method of claim 7 in which the liquid petroleum hydrocarbon fraction is crude oil.

9. The method of claim 7 in which the liquid petroleum hydrocarbon fraction is a refined oil fraction.

10. The method of claim 7 in which the partial pressure ratio is about 1.3:1.

11. A solution of carbon dioxide and a hydrocarbon gas predominantly methane in a liquid petroleum hydrocarbon fraction.

12. The solution of claim 11 where the gas predominantly methane is methane.

13. The solution of claim 11 where the gas predominantly methane is natural gas.

14. A pressure container containing a solution of carbon dioxide and a hydrocarbon gas predominantly methane in a liquid petroleum hydrocarbon fraction, the volume ratio of gas predominantly methane to liquid petroleum hydrocarbon fraction being at least 13 and the volume ratio of carbon dioxide to liquid petroleum hydrocarbon fraction being at least 32.

15. The article of claim 14 in which the gas predominantly methane is methane, the volume ratio of methane to fraction is at least 18, and the volume ratio of carbon dioxide to fraction is at least 56.

16. The article of claim 15 in which the fraction is a crude petroleum oil.

17. The article of claim 15 in which the fraction is a refined petroleum oil fraction.

18. The article of claim 14 in which the gas predominantly methane is natural gas.

19. The article of claim 18 in which the fraction is a crude petroleum oil.

20. The article of claim 18 in which the fraction is a refined petroleum oil fraction.

21. A solution of carbon dioxide and a hydrocarbon gas predominantly methane in a liquid petroleum oil.

22. The solution of claim 21 in which the oil is crude oil.

23. The solution of claim 21 in which the oil is a refined oil.

References Cited in the file of this patent

UNITED STATES PATENTS

| | | |
|---|---|---|
| 512,894 | Noteman | Jan. 16, 1894 |
| 662,258 | Dickerson | Nov. 20, 1900 |
| 1,990,499 | Odell | Feb. 12, 1935 |
| 2,303,050 | Jones | Nov. 24, 1942 |
| 2,426,630 | Mapes | Sept. 2, 1947 |
| 2,642,154 | Woolcock | June 16, 1953 |
| 2,692,959 | Wright | Oct. 26, 1954 |